United States Patent [19]

Carlen

[11] Patent Number: 5,160,886
[45] Date of Patent: Nov. 3, 1992

[54] PERMANENT MAGNET RESOLVER FOR PRODUCING A RESOLVER-TO-DIGITAL CONVERTER COMPATIBLE OUTPUT

[75] Inventor: Eric T. Carlen, Roanoke, Va.

[73] Assignee: Carlen Controls, Inc., Roanoke, Va.

[21] Appl. No.: 655,308

[22] Filed: Feb. 14, 1991

[51] Int. Cl.⁵ .................. G01B 7/30; G01B 7/14; G05D 3/00; H03M 1/48
[52] U.S. Cl. .................. 324/207.16; 318/661; 324/207.18; 324/207.25; 340/870.33; 341/112
[58] Field of Search ............... 324/163, 166, 173, 174, 324/207.15, 207.16, 207.17, 207.18, 207.19, 207.25; 340/671, 672, 870.31, 870.32, 870.33, 870.34; 310/155, 168; 318/659–661; 341/15, 112, 116

[56] References Cited

U.S. PATENT DOCUMENTS

| | | |
|---|---|---|
| 2,269,453 | 1/1942 | Gayhart . |
| 2,340,609 | 2/1944 | Mestas . |
| 2,805,677 | 9/1957 | Baird .................. 324/207.18 |
| 2,902,765 | 9/1959 | Chater . |
| 2,914,756 | 11/1959 | Heidenhain et al. . |
| 3,226,711 | 12/1965 | Lautzenhiser . |
| 3,582,924 | 6/1971 | Uemura . |
| 3,628,145 | 12/1971 | Kihlberg et al. . |
| 3,735,391 | 5/1973 | Games et al. . |
| 3,850,015 | 11/1974 | Andresen .................. 324/207.16 |
| 3,956,693 | 5/1976 | Zutrauen et al. . |
| 4,013,911 | 3/1977 | Fujiwara et al. . |
| 4,024,458 | 5/1977 | Templin .................. 324/207.16 |
| 4,039,946 | 8/1977 | Nola .................. 324/174 |
| 4,045,738 | 8/1977 | Buzzell . |
| 4,053,826 | 10/1977 | Wasawa et al. . |
| 4,309,702 | 1/1982 | Mibu et al. . |
| 4,486,845 | 12/1984 | Duckworth . |
| 4,503,391 | 3/1985 | Hinke . |
| 4,604,575 | 8/1986 | Shimizu et al. . |
| 4,628,314 | 12/1986 | Morinaga et al. . |
| 4,695,795 | 9/1987 | Nakamizo et al. . |
| 4,717,874 | 1/1988 | Ichikawa et al. .................. 324/207.16 |
| 4,746,859 | 5/1988 | Malik .................. 324/27.25 X |
| 4,755,751 | 7/1988 | Ray . |
| 4,764,767 | 8/1988 | Ichikawa et al. . |
| 4,829,245 | 5/1989 | Echasseriau et al. . |
| 4,870,358 | 9/1989 | Glaize et al. .................. 324/207.25 X |
| 4,924,180 | 5/1990 | Nasr et al. .................. 324/207.25 X |
| 4,962,331 | 10/1990 | Smith . |

Primary Examiner—Gerard R. Strecker
Attorney, Agent, or Firm—Sterne, Kessler, Goldstein & Fox

[57] ABSTRACT

A simplified magnetic resolver for measurement of rotary or linear position which comprises a permanent magnet rotor and two pairs of sensing coils. The resolver produces sine and cosine outputs compatible with known resolver-to-digital converters.

11 Claims, 7 Drawing Sheets

PERMANENT MAGNET RESOLVER FOR PRODUCING A RESOLVER-TO-DIGITAL CONVERTER COMPATIBLE OUTPUT

FIELD OF THE INVENTION

This invention relates generally to the art of position detectors for absolute or incremental measurement of linear or rotary position. More specifically, the invention relates to a saturable core magnetic resolver which uses a moving permanent magnet rotor and produces outputs which are directly compatible with known resolver-to-digital converters.

BACKGROUND OF THE INVENTION

Modern industrial systems often employ closed-loop feedback to provide accurate process control. Such closed-loop systems require accurate sensing of the parameters to be controlled. In the case of rotary position (or motion), magnetic resolvers are a preferred sensing means. A common magnetic resolver employs a rotor mounted on a rotating shaft which is magnetically coupled to a stator positioned closely adjacent the rotor. Excitation of a coil on the rotor will produce a magnetic field. The magnetic flux lines of this field, which rotates with the rotor, are sensed by first and second stator coils. The sinusoidal currents induced in these sense coils by the rotor coil's magnetic flux is representative of the rotor's rotational position.

If digital position data is desired rather than these analog signals, the sinusoidal position signals can be fed into a resolver-to-digital converter to produce digital position information. Known resolver-to-digital converters have been designed to directly accept these sinusoidal outputs of the known resolver to produce binary outputs.

This known resolver, however, has a major drawback in the complexity of both its rotor and stator windings. Multiple coils are required on both the rotor and the stator. Therefore, multipole resolvers can become extremely intricate and, as a result, costly to manufacture. It has been shown that the rotor of a resolver can be greatly simplified by replacing the rotor coil windings with permanent magnets. The permanent magnets act to change the reluctance seen by the flux of the stator sense coils when those coils are excited. U.S. Pat. Nos. 4,604,575 and 4,764,767 are representative of such permanent magnet resolvers. These known devices, however, utilize complex output circuits in order to produce digital position information. It is an object of the present invention to overcome this and other problems of known resolvers.

SUMMARY OF THE INVENTION

A permanent magnet resolver for measurement of rotary or linear position which produces sine and cosine analog outputs which are directly compatible with known resolver-to-digital converters is disclosed. This new resolver comprises a permanent magnet rotor, a first coil set comprising first and second magnetic coils, and a second coil set comprising third and fourth magnetic coils. An AC signal source provides an excitation signal to each coil. A sensing means senses the coil voltage for each coil. The coils in each coil set are disposed such that one coil senses the magnetic field from the permanent magnet rotor 180 degrees out of phase from the other coil.

The coil sets are disposed such that the first set senses the magnetic field from the permanent magnet rotor 90 degrees out of phase from the second coil set. The signal from each coil is rectified and the signals from the two coils in a set are subtracted to yield a sinusoidal difference signal. The output of one coil set represents the function sine($\theta$) while the output of the other coil set represents the function cosine($\theta$). These two signals are then amplitude modulated with a 2.5 KHz carrier to yield an output which is compatible with known resolver-to-digital converters.

ADVANTAGES OF THE PRESENT INVENTION

It is an advantage of the present invention that the rotor of a magnetic resolver is simplified. This aids in reducing size, cost, and complexity of the resolver.

It is a further advantage of the present invention that a simplified resolver is produced which is directly output compatible with existing resolver-to-digital converters.

It is another advantage of the present invention that the stator (or pickup) coils of a permanent magnetic resolver are simplified by utilizing a single coil wound on a bobbin core for both sensing and excitation.

It is yet another advantage of the present invention that continuous position information is provided independent of the rotational speed of the resolver rotor.

PREFERRED EMBODIMENT OF THE PRESENT INVENTION

Figure 2:
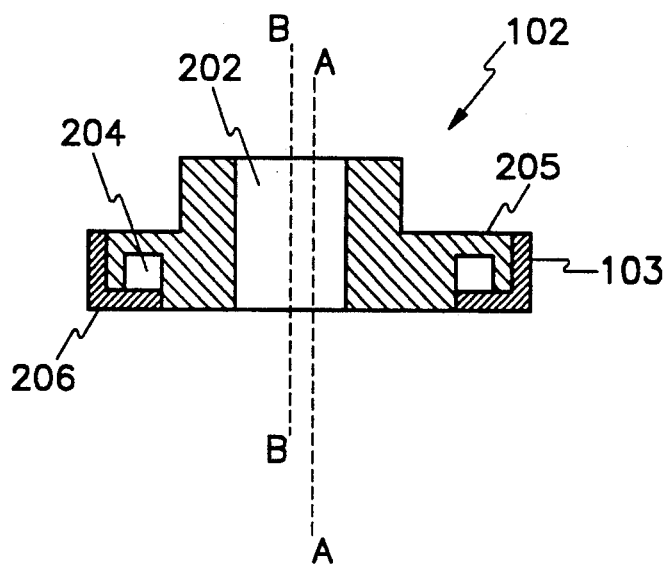
FIG. 2 is a cross-sectional view of the rotor of FIG. 1 taken along axis A.
Figure 1:
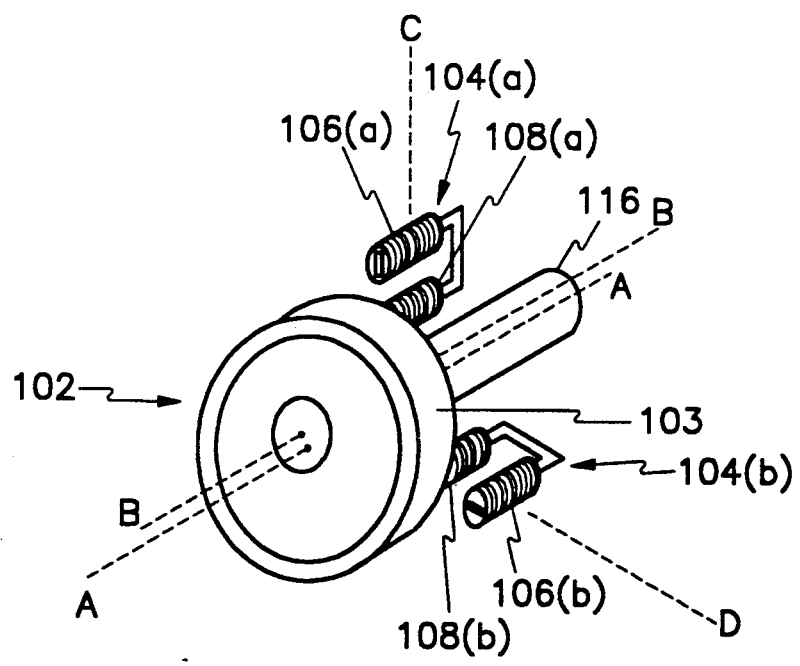
FIG. 1 is a perspective view of the single pole embodiment of the present invention.

Referring first to FIGS. 1–6, a single pole embodiment of the present resolver will be discussed. It should be understood that magnetic poles exist in pairs, and a single magnetic pole cannot exist without its complement. Thus, when a single pole resolver is discussed, it is because the invention is concerned with the magnetic field proximate to only one pole of a permanent magnet.

The resolver comprises three functional components: an annular rotor 102, two magnetic pick-up coil sets 104, and two output circuits 500. A first coil set 104 is associated with a first output circuit 500 to form a cosine half of the resolver. A second coil set 104 is associated with a second output circuit 500 to form a sine half of the resolver. The sine half of the resolver is substantially identical to the cosine half of the resolver. Accordingly, it is only necessary to describe the electrical operation of one of coil sets 104 and output circuits 500.

The cosine half of the resolver is chosen for discussion. In the drawings, like elements are given similar reference numerals. Where discrimination between like elements in the analogous cosine and sine halves of the resolver is necessary, the additional designation (a) for cosine half or (b) for sine half is used.

Rotor 102 is an annulus having a circumferential surface 103, a lateral surface 205, and a central axis (A). Rotor 102 is preferably made from any suitable plastic material. A permanent ring magnet 204 is disposed within rotor 102 and is concentrically aligned about central axis (A). A flux concentrator ring 206 is disposed at the periphery of rotor 102 concentrically adjacent to ring magnet 204. Flux concentrator ring 206 is made from a suitable magnetic material, preferably iron or a nickel-iron alloy.

A longitudinal bore 202 is eccentrically disposed in rotor 102. Bore 202 is centered about an axis (B). Rotor 102 is mountable on a rotatable shaft 116 by way of bore 202 such that shaft 116 is centered about axis (B). Rotor 102 has a minor radius and a major radius with respect to axis (B) and shaft 116.

Upon rotation of shaft 116, the radial distance between the circumferential surface of rotor 102 and a circumferentially adjacent reference point will vary sinusoidally. One complete revolution of rotor 102 will equal one wavelength ($\lambda$) or 360 degrees of the sinusoid. The maximum distance will occur when the reference point is adjacent to the portion of rotor 102 defining the minor radius and correspondingly, the minimum distance will occur when the reference point is adjacent to the portion of rotor 102 defining the major radius.

Coil sets 104 each comprise two substantially identical pick-up coils 106 and 108. Coils 106 and 108 are used for sensing the position of rotor 102 by sensing the presence of a magnetic field. Each coil acts as an autotransformer. Coil sets 104 are disposed adjacent to lateral surface 205 of rotor 102. Coils 106 are positioned to achieve optimal magnetic coupling with ring magnet 204 at the point of maximum radius of rotor 102. Coils 108 are positioned to achieve optimal magnetic coupling with ring magnet 204 at the point of minimum radius of rotor 102.

Coils 106(a) and 108(a) are disposed co-linearly along a first radial axis (C) perpendicular to axis (B) such that the radial distance between coils 106(a) and 108(a) is equivalent to twice the eccentric offset of rotor 102 or twice the distance between axes (A) 108(a) mandates that coil 108(a) is 180 degrees ($\lambda/2$) out of phase from coil 106(a) with respect to ring magnet 204.

Coil set 104(b) (sine set) is similarly disposed. However, coils 106(b) and 108(b) are disposed co-linearly along a second radial axis (D) perpendicular to axis (B). Axis (D) is circumferentially displaced from axis (C) by 90 degrees ($\lambda/4$) of rotor arc such that coil set 104(b) is 90 degrees ($\lambda/4$) out of phase from coil set 104(a) with respect to ring magnet 204.

Flux concentrator ring 206 functions to focus the magnetic flux of ring magnet 204 toward lateral surface 205 of rotor 102 where coil sets 104 are disposed.

Figure 3:
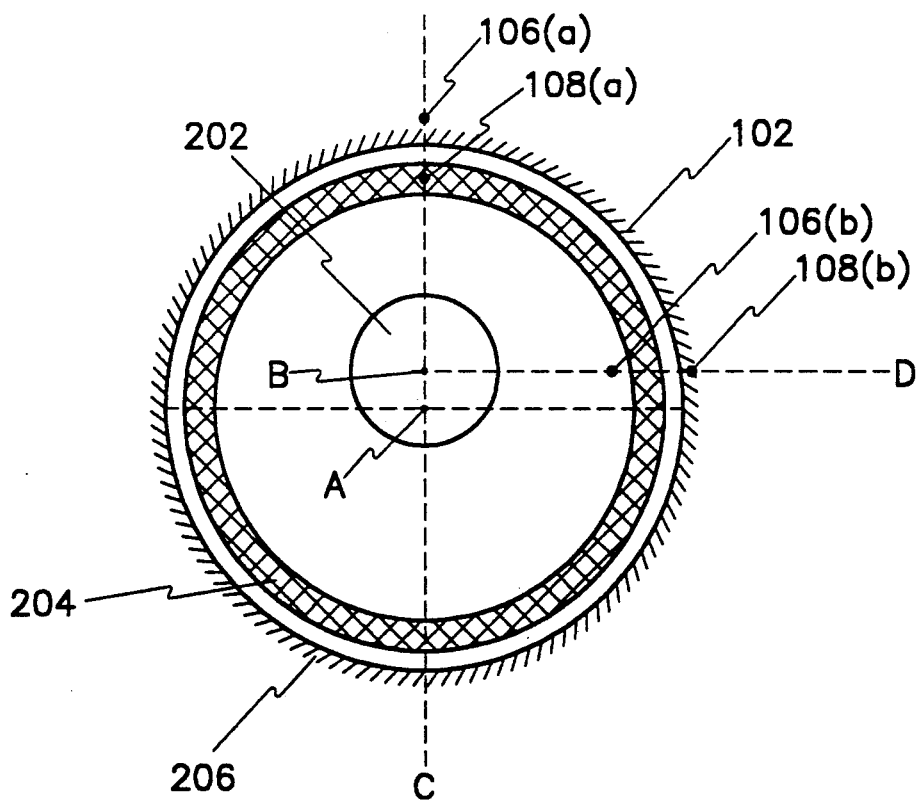
FIG. 3 is a cross-sectional view of the rotor of FIG. 1 taken perpendicular to axis A.

Referring specifically to FIG. 3, a cross-section of rotor 102 is shown. Axes A and B, which extend perpendicular to the plane formed by the drawing sheet, are shown as points A and B. The positions of coils 106 and 108 and axes C and D are superimposed on the cross-section of rotor 102 to illustrate relative positioning.

Figure 4:
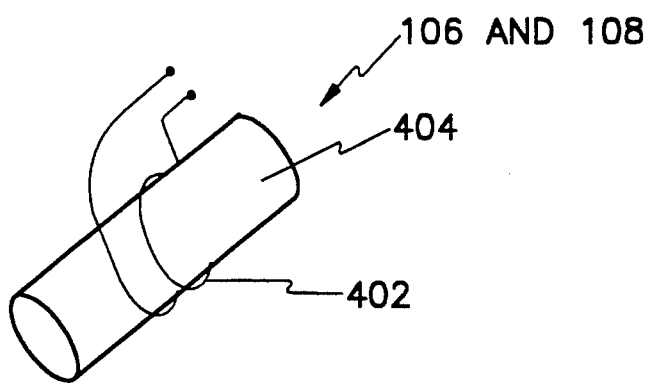
FIG. 4 is a perspective view of the magnetic pick-up coil of the present invention.

FIG. 4 shows the coil design for coils 106 and 108. The coil comprises an excitation winding 402 wound on a core 404. Core 404 is a saturable core made from a soft iron material such as laminated Permalloy (Manufactured by Magnetics, Inc.). Coil sets 104 each have a corresponding output circuit 500 (shown in FIGS. 5 and 6).

Figure 5:
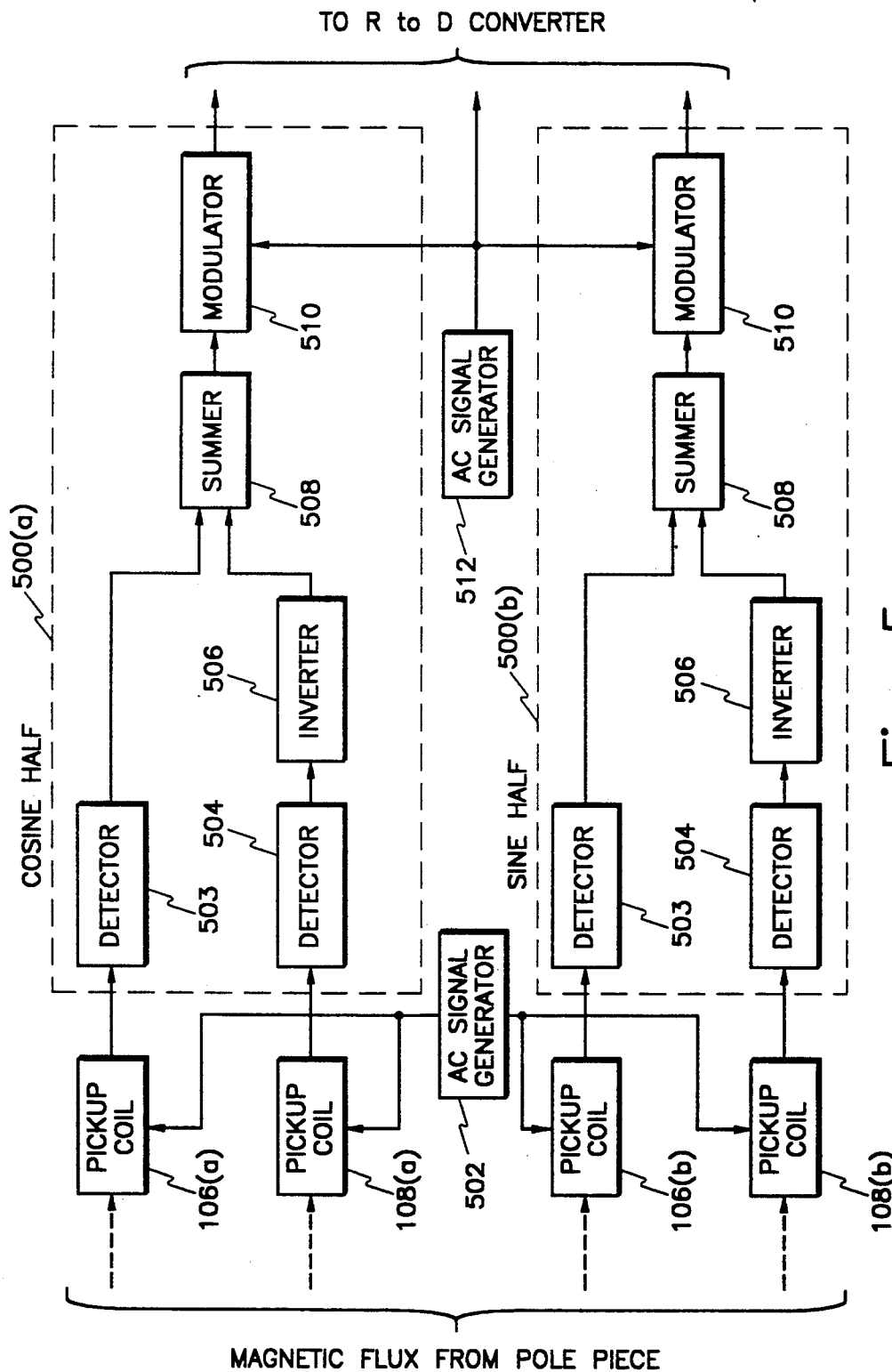
FIG. 5 is a block diagram of the resolver of the present invention.
Figure 6:
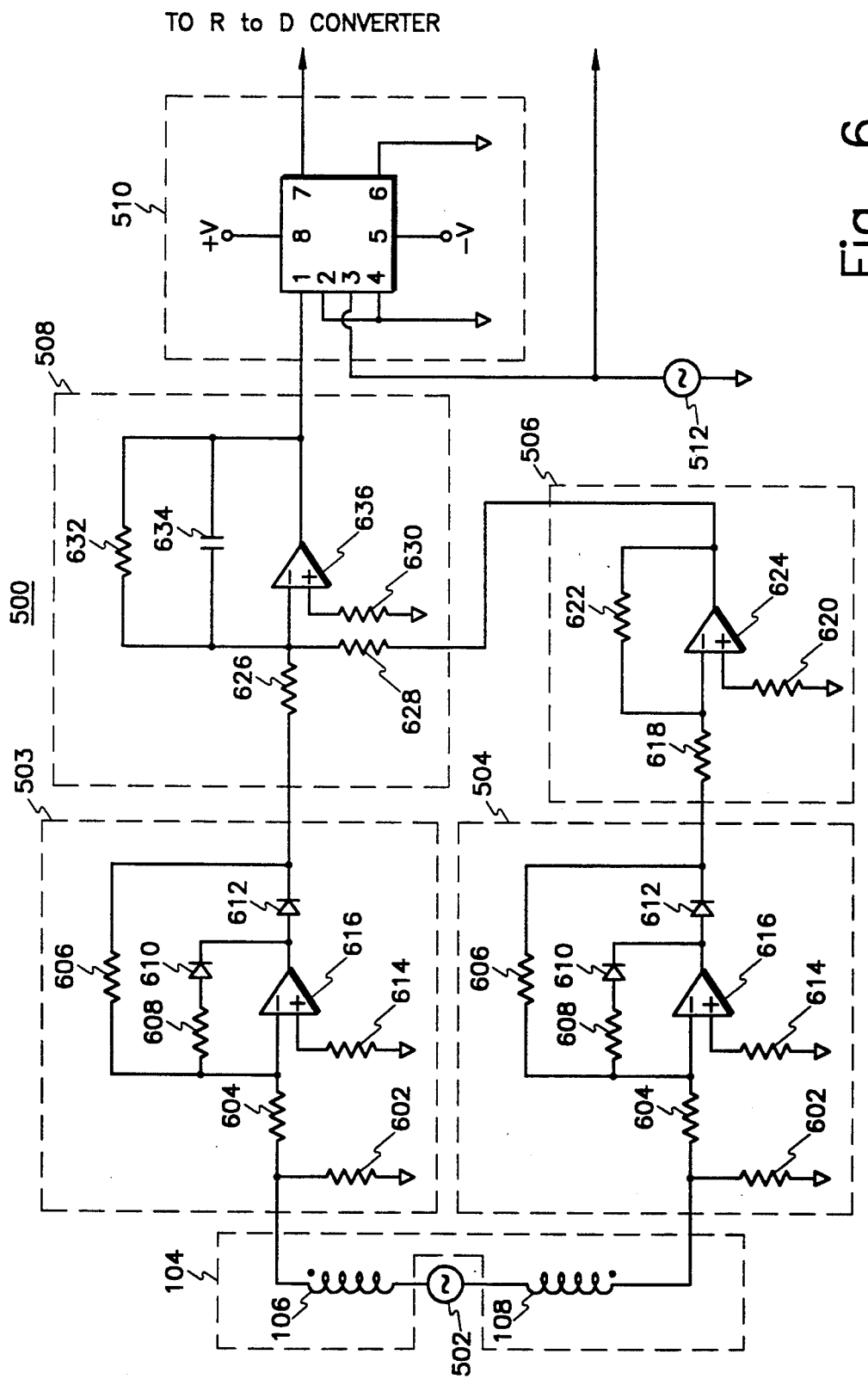
FIG. 6 is a schematic diagram of one of output circuits 500.

Referring now to FIGS. 5 and 6, output circuit 500 is described. Coils 106 and 108 are serially connected to an AC signal source 502. The output frequency of source 502 is selected in accordance with the response characteristics of coils 106 and 108 and is chosen to be many times greater than the highest rotational frequency of rotor 102. A 50 KHz signal allows for compact coil geometry and is chosen for the preferred embodiment.

Coils 106 and 108 are each serially connected to a sense resistor 602 to form a voltage divider. Resistors 602 are part of op amp detectors 503 and 504. The AC signal from source 502 divides between coil 106 (or 108) and resistors 602 as a function of the coil and the resistor impedances. Detectors 503 and 504 actually sense the voltage across resistors 602 rather than coils 106 and 108, but the two voltages are related via the standard voltage divider relationship. Detectors 503 and 504 then rectify the sinusoidal voltage sensed across resistors 602.

Inverter 506 is employed in series with detector 504. Op amp summer 508 is serially connected to detector 503 and inverter 506. Summer 508 adds the outputs of detector 503 and inverter 506 [which is the inverted output of detector 504]. Modulator 510 is serially connected to the outputs of summer 508. Modulator 510 modulates the amplitude of a 2.5 KHz carrier signal from a sinusoidal source 512 in accordance with the output of summer 508 to achieve an output signal which is compatible with known resolver-to-digital (R-to-D) converters. Accordingly, the resultant output of modulator 510 is compatible with commonly used R-to-D converters such as the Analog Devices Inc. 2S80, 2S81 or 2S82.

Detectors 503 and 504 each comprise: resistors 602, 604, 606, 608, and 614; diodes 610 and 612; and an operation amplifier 616. Detector 503 is identical to detector 504. Inverter 506 comprises: resistors 618, 620 and 622; and operational amplifier 624. Summer 508 comprises: resistors 626, 628, 630, and 632; capacitor 634; and operational amplifier 636. Modulator 510 is a known multiplier integrated circuit, such as the Analog Devices Inc. AD834. Signal generator 512 provides a 2.5 KHz signal to modulator 510 and to the R-to-D converter. As previously noted, output circuits 500(a) and 500(b) are identical circuits.

Figure 7:
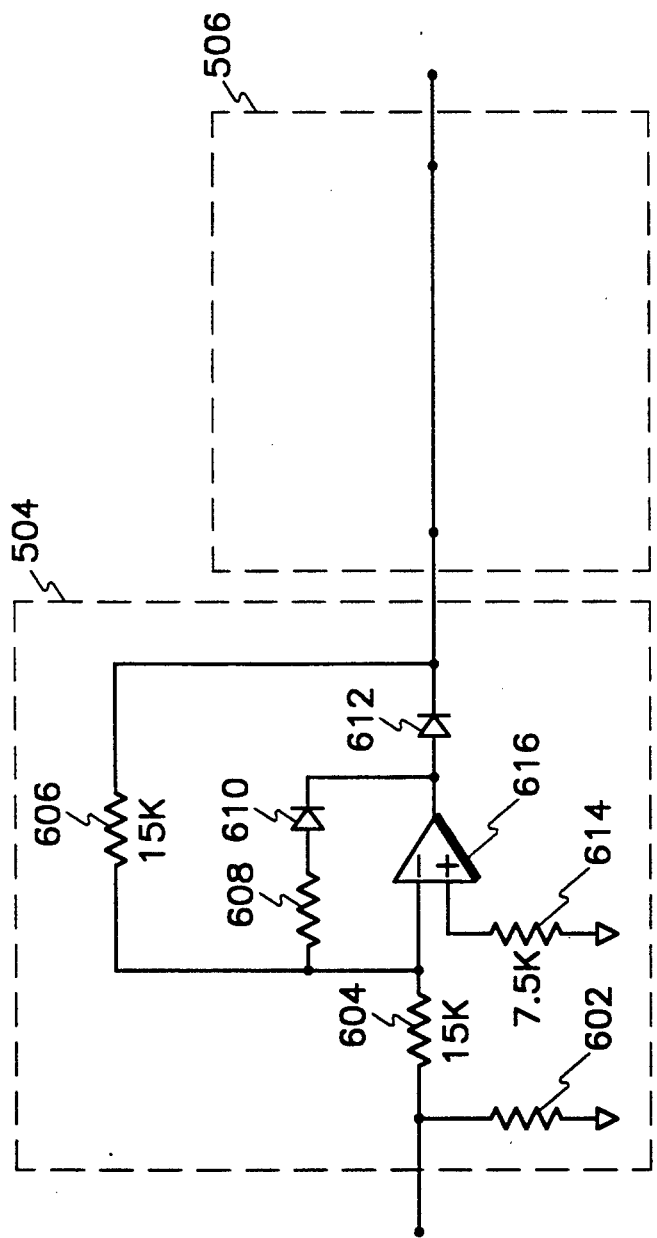
FIG. 7 is a schematic diagram of an alternate embodiment of detector circuit 504 and inverter circuit 506 of FIGS. 5 and 6.

In the preferred embodiment, inverter 506 may be eliminated by reversing the polarities of diodes 610 and 612 in detector 504. This preferred circuit is shown in FIG. 7. Reversing the circuit orientation of diodes 610 and 612 allows detector 504 to produce a non-inverted rectified signal directly. Thus, since detector 504 does not produce an inverted signal, there is no need to invert its output and inverter 506 is thereby eliminated. Although, this is the preferred embodiment of the invention, for simplicity of discussion, operation of the preferred embodiment will be described with detection and inversion occurring in two distinct stages as shown in FIGS. 5 and 6.

A value of inductance for coils 106 and 108 is chosen so that the coils present a large impedance to the 50 KHz signal from source 502 with respect to resistors 602. Thus, absent an external magnetic field acting on coils 106 and 108, substantially all of the voltage from source 502 will be seen across the coils. Any signal that does appear across resistors 602 will be rectified by detectors 503 and 504. The rectified signal output from detector 504 is then inverted by inverter 506. Next, the rectified signal from detector 503 is summed with the rectified, inverted signal from inverter 506 to produce a difference signal. Given a steady state condition where the voltages input to detectors 503 and 504 are equal, summer 508 will have a zero output.

If an external magnetic field is caused to act on a coil 106(a), a reduction in the permeability of its core 404 will occur. Reducing core permeability will, in turn, reduce the inductance of coil 106(a). This will change the voltage dividing relationship between coil 106(a) and resistor 602 such that more of the signal from source 502 will be seen across resistor 602. This will cause an imbalance between the previously equal outputs from detectors 503 and 504. Correspondingly, a net output signal will be produced by summer 508.

In operation, rotor 102 (FIG. 1) provides the external magnetic field which saturates coils 106 and 108 as discussed above. As rotor 102 is rotated, coils 106 and 108 will be subject to a magnetic field of varying intensity. The field intensity in cores 404 will vary as a function of the proximity from each coil to ring magnet 204. As set forth above, coil set 104(a) is positioned such that rotation of rotor 102 will cause ring magnet 204 to sinusoidally oscillate positionally between optimum flux coupling with coil 106(a) and optimum flux coupling with coil 108(a). The magnetic field generated by ring magnet 204 will cause a coil to saturate when the magnet is closely adjacent to the coil. Saturation will drastically reduce the inductance of the coil and cause substantially all of the signal from source 502 to be seen across the resistor 602 which corresponds to that particular coil.

Figure 8:
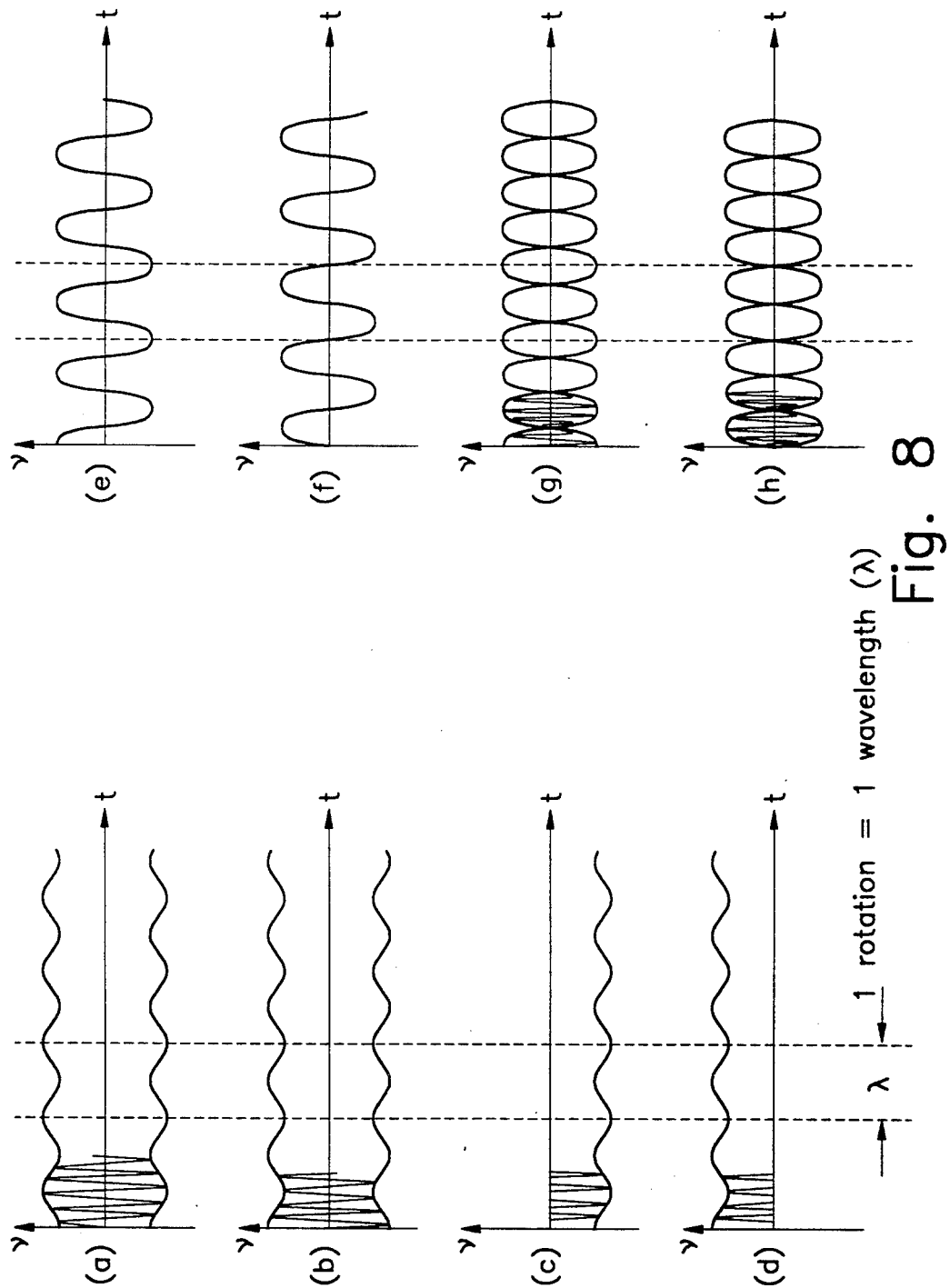
FIGS. 8 (a)–(h) illustrate the electrical signals present at various points throughout the resolver circuitry shown in FIG. 5.

FIG. 8(a) depicts the voltage across resistor 602 of detector 503. FIG. 8(b) depicts the voltage across resistor 602 of detector 504. Note that waveform 8(b) is 180 degrees (λ/2) out of phase from waveform 8(a). FIG. 8(c) shows the output signal from detector 503. Note that the detector produces an inverted, rectified signal. FIG. 8(d) shows the inverter 506. The addition of signals 8(c) and 8(d) by summer 508(a) produces the sinusoid shown as 8(e). The sinusoid shown at 8(e) is described by:

$$k \cdot \cos(\theta)$$

where:
  k is a constant
  $\theta$ = rotational angle of rotor 102 with respect to coil set 104(a)

A corresponding signal 90 degrees out of phase from the signal of 8(e) is shown in FIG. 8(f). This signal is output from summer 508(b) of output circuit 500(b). This sinusoid is described by:

$$k \cdot \sin(\theta)$$

FIG. 8(g) shows the amplitude modulated signal output from modulator 510(a). This signal is described by:

$$k \cdot \cos(\theta) \cdot \cos(wt)$$

where:
  w = frequency of modulating signal

FIG. 8(h) shows the amplitude modulated signal output from modulator 510(b). This signal is described by:

$$k \cdot \sin(\theta) \cdot \cos(wt)$$

In this manner, modulators 510 produce output signals which are equivalent to those produced by more complex resolvers (such as those with AC excited rotor coils). These outputs are therefore fully compatible for use with known R-to-D converters. The result is a simple permanent magnet resolver which can economically yield digital outputs by interfacing with commercially available (and common in the industry) R-to-D converters.

The resolver heretofore described is a simple single pole (single pole pair) device capable of rotational position sensing with an accuracy of ±3′. If further accuracy is required, a multipole resolver may be employed. The multipole resolver is capable of an accuracy of ±3′ divided by the number of poles (every pole is used in the multipole embodiment). For example, a thirty-six pole pair resolver (having 72 poles) is capable of an accuracy of ±2.5″.

Figure 9:
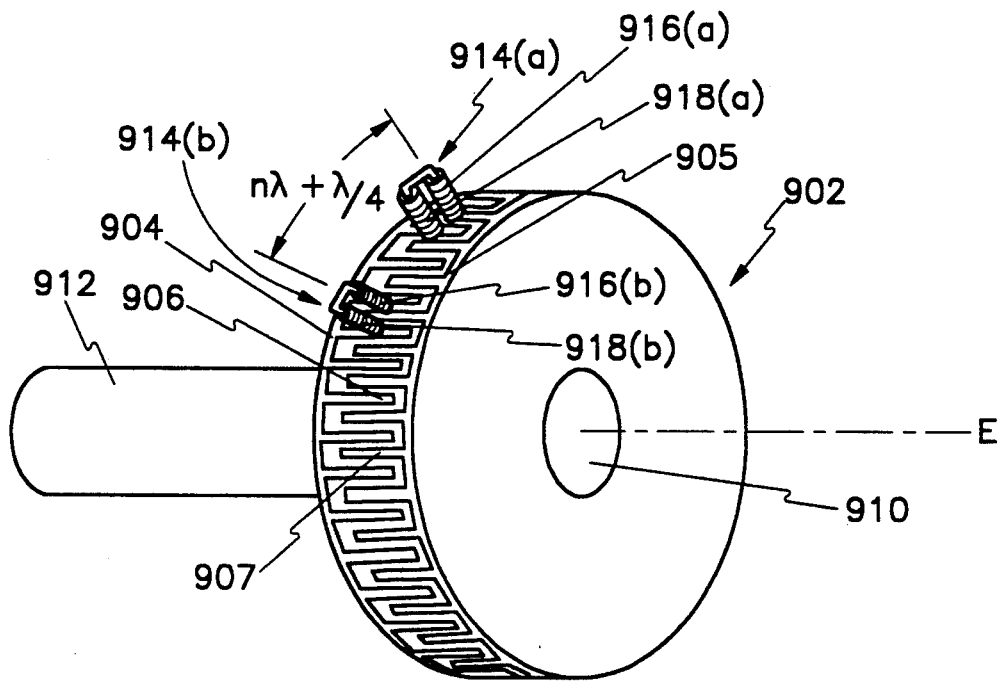
FIG. 9 is a perspective view of the multipole embodiment of the present invention.
Figure 10:
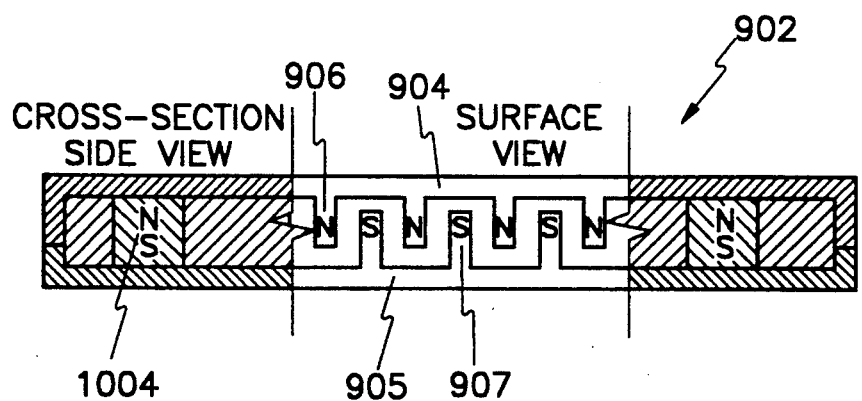
FIG. 10 is a surface/cross-sectional view of rotor 902.

The preferred embodiment of a multipole resolver of the present invention is now described with reference to FIGS. 9 and 10. A thirty-six pole pair rotor is shown for illustration purposes. In practical application, the number of poles would be chosen to achieve a desired resolution.

An annular rotor 902 has a central axis (E). Rotor 902 is preferably made from any suitable plastic material. A permanent ring magnet 1004 is disposed within rotor 902 and is concentrically aligned about central axis (E). Flux concentrator shoes 904 and 905 are disposed at the lateral faces of rotor 902 adjacent to ring magnet 1004. Shoes 904 and 905 are iron or nickel-iron alloy "L" shaped rings. At the circumferential edge of rotor 902, shoes 904 and 905 extend over onto the circumferential face of rotor 902 in a series of evenly spaced finger-like laminates 906 and 907. Laminates 906 of shoe 904 are alternately interleaved with laminates 907 of shoe 905 to form a series of poles along the circumferential surface of rotor 902 as shown in FIGS. 9 and 10. A central longitudinal bore 910 is concentrically disposed in rotor 902. Rotor 902 is mountable on a rotatable shaft 912 by way of bore 910.

The interleaved pole pattern formed on the surface of the annular rotor 902 may be adapted for use in other applications. For example, in a linear application, a bar magnet could be substituted for ring magnet 1004 and shoes 904 and 905 could be modified accordingly. This would allow sensing of linear rather than rotary position.

Similar to the single pole embodiment discussed above, two identical coil sets, each comprising two identical coils, are employed for sensing rotor position. A first coil set 914(a) (cosine set) comprises a first coil 916(a) and a second coil 918(a). A second coil set 914(b) (sine set) comprises a first coil 916(b) and a second coil 918(b). Coil sets 914 are disposed circumferentially adjacent to rotor 902.

Each magnetic pole formed by a laminate 906 or 907 is equal to one wavelength (λ). Thus, as the single pole rotor completed one cycle per revolution of rotor 102

(i.e., 1 revolution=λ), the thirty-six pole pair rotor will complete seventy-two cycles per revolution (i.e. 1 revolution=72λ, or λ=5 degrees of rotor 902 rotation). Coils 916(a) and 918(a) of coil set 914(a) are circumferentially separated by a distance of $(n_1\lambda+\lambda/2)$ or 2.5 degrees of rotor arc, where $n_1$ is an integer between 0 and the number of poles. Similarly, coils 916(b) and 918(b) of coil set 914(b) are circumferentially separated by a distance of $(n_2\lambda+\lambda/2)$ or 2.5 degrees of rotor arc, where $n_2$ is an integer between 0 and the number of poles. Coil set 914(a) is circumferentially separated from coil set 914(b) by a distance of $(n_3\lambda+\lambda/4)$, where $n_3$ is an integer between 0 and the number of magnetic poles.

The multipole resolver uses output circuitry identical to the output circuits of the single pole resolver. Thus, coil sets 914 utilize output circuits 500. The multipole resolver, however, is an absolute resolver only within one wavelength (λ). In other words, the resolver is only able to detect absolute position between two poles of a pole pair (i.e., 5 degrees for a 36 pole pair resolver). If absolute positional information is required with a higher degree of accuracy than can be achieved with a single pole resolver, then an absolute position resolver (such as the single pole embodiment described above) must be used in conjunction with the multipole resolver.

Although the invention has been described and illustrated with a certain degree of particularity, it is understood that those skilled in the art will recognize a variety of applications and appropriate modifications within the spirit of the invention and the scope of the claims.

What is claimed is:

1. A magnetic resolver for measurement of absolute rotary position comprising:
   a permanent ring magnet magnetized in an axial direction and eccentrically rotatable about a longitudinal axis, said ring magnet producing a magnetic field, said ring magnet having a minor radius and a major radius with respect to said longitudinal axis;
   first magnetic sensing means for sensing said magnetic field, said first sensing means being disposed adjacent to said ring magnet on a first radial axis perpendicular to said longitudinal axis at a radial distance substantially equal to said major radius;
   second magnetic sensing means for sensing said magnetic field, said second magnetic sensing means being disposed adjacent to said ring magnet on said first radial axis at a radial distance substantially equal to said minor radius;
   third magnetic sensing means for sensing said magnetic field, said third magnetic sensing means being disposed adjacent to said ring magnet on a second radial axis perpendicular to said longitudinal axis at a radial distance substantially equal to said major radius, wherein said second radial axis is disposed at an angle of substantially ninety (90) degrees with respect to said first radial axis; and
   fourth magnetic sensing means for sensing said magnetic field, said fourth magnetic sensing means being disposed adjacent to said ring magnet on said second radial axis at a radial distance substantially equal to said minor radius.

2. A magnetic resolver as set forth in claim 1, wherein said first, second, third and forth magnetic sensing means each comprise:
   a coil including a saturable core and a length of wire wound thereon.

3. A magnetic resolver as set fourth in claim 2, further comprising:
   an AC signal source electrically connected to each said coil for exciting each said coil with an AC signal;
   a first detector circuit electrically connected to said first magnetic sensing means, a second detector circuit electrically connected to said second magnetic sensing means, a third detector circuit electrically connected to said third magnetic sensing means, a fourth detector circuit electrically connected to said fourth magnetic sensing means, each said detector circuit adapted to detect an AC signal from a corresponding coil and to produce an output signal representative of the detected AC signal;
   first differencing means for differencing the output signals from said first and second detector circuits to produce a first position signal indicative of the rotary position of said ring magnet; and
   second differencing means for differencing the output signals from said third and fourth detector circuits to produce a second position signal indicative of the rotary position of said ring magnet.

4. A magnetic resolver as set forth in claim 3, further comprising:
   a first modulating means for modulating said first position signal; and
   a second modulating means for modulating said second position signal.

5. A magnetic resolver for measurement of rotary position comprising:
   an annular rotor having a plurality of magnetic poles disposed thereon, said poles producing a magnetic field, said poles being arranged substantially equidistant from each other to define an angle λ between adjacent poles, said angle being equal to (360°/n), where n equals the number of said poles;
   a first sensing means for sensing said magnetic field, said first sensing means being disposed adjacent to said magnetic poles;
   a second sensing means for sensing said magnetic field, said second sensing means being disposed adjacent to said magnetic poles and displaced an angular distance of $(x_1\lambda+\lambda/2)$ from said first sensing means, where $x_1$ is an integer between zero and the number of magnetic poles;
   a third sensing means for sensing said magnetic field, said third sensing means being disposed adjacent to said magnetic poles and displaced a distance of $(x_2\lambda+\lambda/4)$ from said first sensing means, where $x_2$ is an integer between zero and the number of magnetic poles;
   a fourth sensing means for sensing said magnetic field, said fourth sensing means being disposed adjacent to said magnetic poles at a distance of $(x_3\lambda+\lambda/2)$ from said third sensing means, where $x_3$ is an integer between zero and the number of magnetic poles;
   an AC signal source electrically connected to each said sensing means for exciting each said sensing means with an AC signal;
   a first detector circuit electrically connected to said first sensing means, a second detector circuit electrically connected to said second sensing means, a third detector circuit electrically connected to said third sensing means, a fourth detector circuit electrically connected to said fourth sensing means, each said detector circuit adapted to detect an AC signal from a corresponding coil and to produce an output signal representative of the detected AC signal;

first differencing means for differencing said output signals from said first and second detector circuits to produce a first position signal indicative of the rotary position of said annular rotor; and second differencing means for differencing the output signals from said third and fourth detector circuits to produce a second position signal indicative of the rotary position of said annular rotor.

6. A magnetic resolver as set forth in claim 5, further comprising:

a first modulating means for modulating said first position signal; and a second modulating means for modulating said second position signal.

7. A magnetic resolver as set forth in claim 6, wherein each of said detector circuits comprises a voltage divider for sensing a voltage across each of said sensing means, and a detector for rectifying said sensed voltage from each of said voltage dividers.

8. A magnetic resolver as set forth in claim 7, wherein said first, second, third and fourth sensing means each comprise:

a coil including a saturable core and a length of wire wound thereon.

9. A magnetic resolver for measurement of rotary or linear position comprising:

a permanent magnet adapted for translation about a fixed path, said magnet producing a magnet field;

a first coil set disposed adjacent to said permanent magnet for sensing said magnetic field, said first coil set comprising a first magnetic coil and a second magnetic coil, said first and second magnetic coils being positioned relative to said permanent magnet such that said magnetic field is sensed by said second magnetic coil one hundred eighty degrees (180°) out of phase with respect to said first magnetic coil;

an AC signal source electrically connected to said first magnetic coil and said second magnetic coil for exciting said first magnetic coil and said second magnetic coil with an AC signal;

a first detection means electrically connected to said first magnetic coil for sensing a voltage induced across said first magnetic coil to produce a first coil voltage signal and for detecting said first coil voltage signal to produce a first detected signal;

a second detection means electrically connected to said second magnetic coil for sensing a voltage induced across said second magnetic coil to produce a second coil voltage signal and for detecting said second coil voltage signal to produce a second detected signal; and first differencing means for differencing said first detected signal and said second detected signal to produce a first sinusoidal position signal indicative of the rotary or linear position.

10. A magnetic resolver as set forth in claim 9, further comprising:

a second coil set disposed adjacent to said permanent magnet for sensing said magnetic field, said second coil set comprising a third magnetic coil and a fourth magnetic coil, said third magnetic coil and said fourth magnetic coil electrically connected to said AC signal source for exciting said third magnetic coil and said fourth magnetic coil with an AC signal, said third magnetic coil being positioned relative to said permanent magnet such that said magnetic field is sensed by said third magnetic coil ninety degrees (90°) out of phase with respect to said first magnetic coil, said fourth magnetic coil being positioned relative to said permanent magnet such that said magnetic field is sensed by said fourth magnetic coil one hundred eighty degrees (180°) out of phase with respect to said third magnetic coil;

a third detection means electrically connected to said third magnetic coil for sensing a voltage induced across said third magnetic coil to produce a third coil voltage signal and for detecting said third coil voltage signal to produce a third detected signal;

a fourth detection means electrically connected to said fourth magnetic coil for sensing a voltage induced across said fourth magnetic coil to produce a fourth coil voltage signal and for detecting said fourth coil voltage signal to produce a fourth detected signal; and second differencing means for differencing said third detected signal and said fourth detected signal to produce a second sinusoidal position signal indicative of the rotary or linear position, said second sinusoidal position signal being 90° out of phase with respect to said first sinusoidal position signal.

11. A magnetic resolver as set forth in claim 10, further comprising:

a first modulating means for modulating said first sinusoidal position signal; and a second modulating means for modulating said second sinusoidal position signal.

* * * * *